(12) United States Patent
Langeslag

(10) Patent No.: US 9,054,581 B2
(45) Date of Patent: Jun. 9, 2015

(54) CONTROLLER FOR SWITCH MODE POWER SUPPLY

(75) Inventor: Wilhelmus Hinderikus Maria Langeslag, Wijchen (NL)

(73) Assignee: NXP B.V., Eindhoven (NL)

( * ) Notice: Subject to any disclaimer, the term of this patent is extended or adjusted under 35 U.S.C. 154(b) by 671 days.

(21) Appl. No.: 13/433,128

(22) Filed: Mar. 28, 2012

(65) Prior Publication Data
US 2012/0249112 A1 Oct. 4, 2012

(30) Foreign Application Priority Data
Apr. 4, 2011 (EP) .................................... 11161018

(51) Int. Cl.
G05F 1/575 (2006.01)
H02M 3/156 (2006.01)
H02M 3/338 (2006.01)
H02M 1/00 (2006.01)

(52) U.S. Cl.
CPC .......... *H02M 3/1563* (2013.01); *H02M 3/3381* (2013.01); *H02M 2001/0048* (2013.01); *Y02B 70/1491* (2013.01)

(58) Field of Classification Search
USPC ................. 323/282–290, 351; 363/74, 78–98
See application file for complete search history.

(56) References Cited

U.S. PATENT DOCUMENTS

| | | | |
|---|---|---|---|
| 7,391,192 B2 * | 6/2008 | Ostrom et al. | 323/274 |
| 7,443,699 B2 | 10/2008 | Lhermite | |
| 7,876,075 B1 * | 1/2011 | Chiu et al. | 323/229 |
| 8,879,289 B2 * | 11/2014 | Lin et al. | 363/97 |
| 2007/0121352 A1 | 5/2007 | Yang et al. | |
| 2008/0157742 A1 * | 7/2008 | Martin et al. | 323/284 |
| 2009/0085546 A1 * | 4/2009 | Phadke et al. | 323/284 |
| 2009/0237057 A1 * | 9/2009 | Dishman et al. | 323/285 |
| 2012/0249112 A1 * | 10/2012 | Langeslag | 323/311 |

FOREIGN PATENT DOCUMENTS

| | | |
|---|---|---|
| CN | 1904622 | 1/2007 |
| CN | 100431251 | 11/2008 |
| WO | 03/026117 A1 | 3/2003 |
| WO | 2005/041395 A1 | 5/2005 |

OTHER PUBLICATIONS

CN counterpart Office Action 201210089302.1 (Feb. 28, 2014).
Extended European Search Report for EP Patent Appln. No. 11161018.4 (Sep. 26, 2011).

* cited by examiner

*Primary Examiner* — Jeffrey Sterrett

(57) ABSTRACT

A switched mode power supply (SMPS) controller is disclosed. The controller comprises a monitoring circuit adapted to monitor the rate of change of a voltage at an input (1) and to monitor the drop in voltage at the input (1) from a peak value. The controller is adapted to generate a signal for closing the switch when the monitored rate of change falls below a first predetermined threshold and the monitored drop in voltage exceeds a second predetermined threshold.

14 Claims, 1 Drawing Sheet

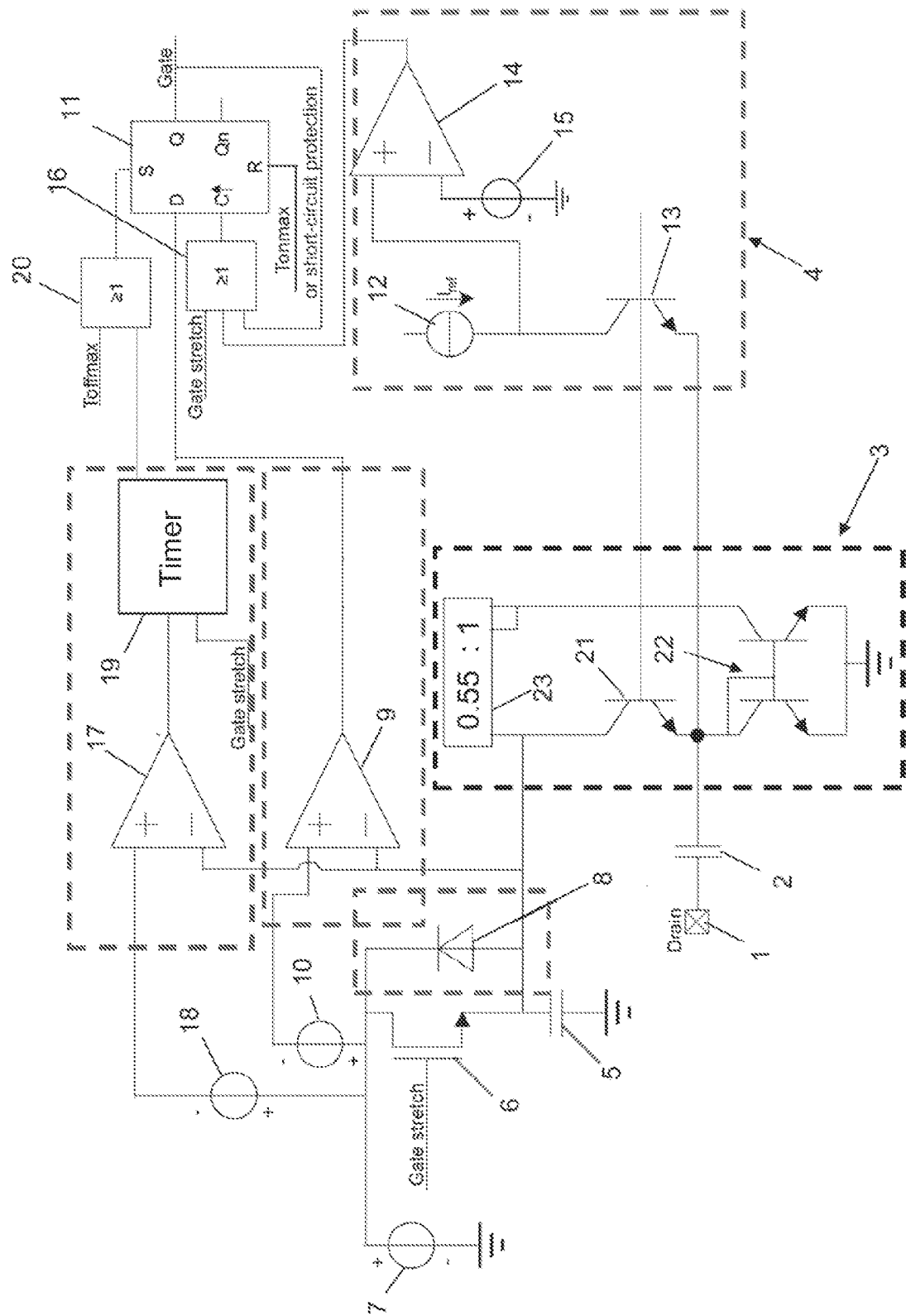

CONTROLLER FOR SWITCH MODE POWER SUPPLY

CROSS-REFERENCE TO RELATED APPLICATIONS

This application claims the priority under 35 U.S.C.§119 of European patent application no. 11161018.4, filed on Apr. 4, 2011, the contents of which are incorporated by reference herein.

The invention relates to a switched mode power supply (SMPS) controller and to a method of controlling a SMPS.

SMPS controllers control the operation of a switch (typically a MOSFET) that causes current to flow through a coil. The switching is controlled to ensure that the DC current flowing through a load coupled to the coil is at a desired, constant value. To minimise switching losses, it is common practice for an SMPS controller to ensure that the switch is actuated either when there is zero current flowing through the coil (and hence, that will flow through the switch as it switches on) or that there is a minimum voltage at the junction between the switch and the coil. This is known as valley switching.

A valley is detected by monitoring the current flowing through a capacitor connected to the junction between the switch and the coil. This works on the principle that the current through a capacitor is related to the rate of change of voltage. Thus, when the current is zero, it can be inferred that the rate of change of voltage is also zero and the voltage is at a peak or valley. The discrimination between a peak and a valley is made with an auxiliary winding electromagnetically coupled to the coil; the polarity of the voltage on this auxiliary winding at the point where the current through the capacitor reaches zero will be different for peaks and valleys. The auxiliary winding also provides power to the SMPS controller.

In many applications, however, the additional cost of the auxiliary winding is prohibitive and alternative types of power supply must be used for the SMPS controller. One such type of power supply draws power from the coil and comprises a capacitor coupled to the junction between the coil and the switch and via a first diode to a reservoir capacitor. A second diode is coupled the junction between the capacitor and first diode to clamp the voltage at that point to ground potential.

With this type of power supply, the capacitor is not conducting when the coil first starts to ring during the period when the switch is turned off. However, it begins to conduct when the voltage on the switch has fallen by a certain amount. When it begins to conduct, this has the effect of slowing down the ringing frequency, which can cause false triggering of the valley detection circuit because the rate of change of voltage at the switch has suddenly decreased. It is therefore possible for the valley detection circuit to actuate the switch before the true valley is reached.

According to a first aspect of the invention, there is provided a switched mode power supply (SMPS) controller comprising a monitoring circuit adapted to monitor the rate of change of a voltage at an input and to monitor the drop in voltage at the input from a peak value, wherein the controller is adapted to generate a signal for closing the switch when the monitored rate of change falls below a first predetermined threshold and the monitored drop in voltage exceeds a second predetermined threshold.

Hence, the invention provides a SMPS controller which requires that a valley is detected (the monitored rate of change of the input voltage falls below the first predetermined threshold) and that the voltage drop at the input has exceeded a second predetermined threshold before a switch in the SMPS will be actuated. This ensures that the spurious valley detection mentioned above is prevented from causing false triggering.

Typically, the input is for coupling, in use, to the junction between a switch and a coil in the SMPS. The input may be coupled to the drain of a MOSFET switch.

In a preferred embodiment, the value of the second predetermined threshold is chosen such that a capacitor coupled to the input and forming part of a charge pump for supplying power, in use, to the SMPS controller is conducting.

The monitoring circuit may be adapted to monitor the drop in voltage by charging a sampling capacitor to a fixed voltage during a first period of operation and discharging the sampling capacitor by drawing a current from it dependent on the rate of change of the voltage at the input during a second period, thereby causing the voltage on the sampling capacitor to drop along with the voltage at the input. In this way, the decrease in voltage during the second period directly represents the decrease in voltage at the input.

Typically, the first period starts and the second period ends when the signal for closing the switch is asserted.

Normally, the first period ends and the second period starts a guard duration after the signal for closing the switch is negated.

Preferably, the monitoring circuit comprises a first comparator adapted to compare the voltage on the sampling capacitor with a first voltage. The first voltage may be derived by generating an offset from the fixed voltage.

The monitoring circuit may be further adapted to generate the signal for closing the switch when the monitored drop in voltage exceeds a third predetermined threshold, lower than or equal to the second predetermined threshold, and a predetermined duration has elapsed after the signal for closing the switch is asserted.

In this case, the monitoring circuit preferably comprises a second comparator adapted to compare the voltage on the sampling capacitor with a second voltage and a timer that is reset when the signal for closing the switch is asserted, the monitoring circuit being adapted to generate the signal for closing the switch when the second comparator indicates that the voltage on the sampling capacitor is lower than the second voltage and the timer indicates that the predetermined duration has elapsed.

In a typical embodiment, the monitoring circuit is adapted to monitor the rate of change of a voltage at the input by comparing a first current dependent on the rate of change of the voltage at the input with a reference current, the second predetermined threshold being passed when the first current falls below the reference current.

The monitoring circuit may be further adapted to inhibit the generation of the signal for closing the switch if the monitored rate of change does not fall below the first predetermined threshold and the monitored drop in voltage does not exceed the third predetermined threshold within a predetermined time period. This provides a simple way of implementing short circuit detection and preventing it from causing damage. The way in which this is achieved by this scheme is described below.

In accordance with a second aspect of the invention, there is provided a SMPS comprising a controller according to the first aspect of the invention, the input of the controller being coupled to a node in the SMPS and the output of the controller being coupled for operating a switch.

The SMPS may be any of several topologies, including buck, boost and flyback.

The SMPS may comprise a switch and a coil coupled in series across a supply voltage, the node to which the input is connected being the junction between the coil and the switch. If the switch is a MOSFET, the node will be the drain of the MOSFET.

In accordance with a third aspect of the invention, there is provided a method of controlling a SMPS, the method comprising monitoring the rate of change of a voltage at an input, monitoring the drop in voltage at the input from a peak value, and generating a signal for closing the switch when the monitored rate of change falls below a first predetermined threshold and the monitored drop in voltage exceeds a second predetermined threshold.

Typically, the input is for coupling, in use, to the junction between a switch and a coil in the SMPS. The input may be coupled to the drain of a MOSFET switch.

The method may further comprise generating the signal for closing the switch when the monitored drop in voltage exceeds a third predetermined threshold, lower than or equal to the second predetermined threshold, and a predetermined duration has elapsed after the signal for closing the switch is asserted.

Preferably, the method further comprises inhibiting the generation of the signal for closing the switch if the monitored rate of change does not fall below the first predetermined threshold and the monitored drop in voltage does not exceed the third predetermined threshold within a predetermined time period.

An example of the invention will now be described in detail with reference to the accompanying drawings, in which:

FIG. 1 shows a circuit diagram of a monitoring circuit for use in a switch mode power supply according to the invention.

FIG. 1 shows an input 1 for connecting to the junction between a coil and a switch (typically a MOSFET, thus the input will be connected to the drain of the MOSFET). The input 1 is coupled via a capacitor 2 to a circuit 3 for controlling the discharge of a capacitor 5 and a valley detection circuit 4.

A signal labeled "Gate stretch" in FIG. 1 is generated within the SMPS controller from the output signal (labeled "Gate" in FIG. 1) for controlling the switching of the gate of the external MOSFET switch. The "gate stretch" signal has a rising edge that is coincident with the rising edge of the "gate" signal, and a falling edge that falls a short while, typically 1 microsecond, after the falling edge of the "gate" signal. The reason for using this "gate stretch" signal is that the voltage on the junction between the coil and the switch (usually a MOSFET) can be assumed to have settled around 1 microsecond after the switch has been opened.

The "gate stretch" signal is coupled to the gate of a MOSFET 6, causing it to switch on when the "gate stretch" signal is high. This causes the capacitor 5 to charge to the output voltage of voltage source 7 through MOSFET 6. When the "gate stretch" signal falls (a short while after the external MOSFET switch has been caused to open by negating the "Gate" signal), this voltage will be held on capacitor 5. The output voltage of voltage source 7 is chosen to be sufficiently high to charge capacitor 5 to a high enough voltage such that as it discharges, the voltage on capacitor 5 remains sufficiently high to ensure that transistor 21 does not saturate. Naturally, the output voltage of voltage source 7 must be lower than or equal to the supply voltage to the circuit.

The current through capacitor 2 will be dependent on the rate of change of voltage across it, and thus on the rate of change of voltage on the input 1. Part of this current is used in circuit 3 to detect the decrease in voltage and part is used in the valley detection circuit 4 to detect a valley. In other embodiments, capacitor 2 could be replaced by two capacitors, one coupled between input 1 and the emitter of transistor 21 and the other between input 1 and the emitter of transistor 13.

When the voltage at the input 1 is dropping, this will cause a current to flow from circuit 3 through capacitor 2 to the input 1. The emitters of transistors 13 and 21 have a largely fixed voltage. Thus, the current through capacitor 2 is almost directly related to the rate of change of voltage at input 1. A corresponding current will be drawn from capacitor 5 by circuit 3, and the voltage on capacitor 5 will therefore drop. By selecting the values of capacitors 2 and 5 to be the same, the voltage drop on capacitor 5 will be half the voltage drop on the input 1 because half of the current flowing through capacitor 2 will flow to the emitter of transistor 13 and half will flow to the emitter of transistor 21. However, in practice the capacitor 5 will be scaled in value relative to capacitor 2 so that the voltage drop on capacitor 5 is lower than half that at the input 1.

The bases of transistors 13 and 21 are biased such that the voltage on their emitters are close to a $V_{be}$ voltage. This is selected as mentioned above so that the emitter of transistor 21 has a fixed voltage. This causes a small current flowing from the emitters of each of transistor 13 and transistor 21 to the lower current mirror 22 of circuit 3. These currents cause a current to be drawn from capacitor 5 and could result in a false measurement of the drop in voltage at the input 1.

To prevent this, a compensating current larger than the discharging current is generated and used to counteract any discharging of capacitor 5. The upper current mirror 23 is used for this. The current supplied to the emitter of transistor 21 from input 1 is half the current through the capacitor 2. It is therefore possible to ensure that when no current is flowing through capacitor 2, no current is drawn from capacitor 5 either if the product of the lower current mirror 22 ratio and upper current mirror 23 ratio is greater than 0.5. The lower current mirror 22 has a ratio of 1:1 and the upper current mirror 23 has a ratio of 0.55 (slightly larger than 0.5 to compensate for spread in production parameters).

Furthermore, when the external MOSFET switch is turned off, there will be a ringing voltage on its drain. This ringing voltage must not be allowed to cause capacitor 5 to discharge over successive cycles of the ringing as this could otherwise result in a sufficient voltage drop on input 1 to be detected either by comparator 9 in conjunction with valley detection or to be detected by comparator 17 along with elapsing of the time period of timer 19 (as discussed below) to occur. In either case, this will result in turning on the external MOSFET switch. Selecting the product of the lower current mirror 22 ratio and upper current mirror 23 ratio is greater than 0.5 prevents this undesirable discharge of capacitor 5 from occurring.

Under certain circumstances, it is possible that the voltage on the input 1 could rise rather than fall once the "gate" signal has been negated, opening the external MOSFET switch. This may occur during start-up or due to the use of an EMI filter. This rise in voltage at the input 1 would cause the voltage on the capacitor 5 to rise, which would result in it no longer having the desired voltage (i.e. the same as the output voltage of voltage source 7). To prevent this, a clamp diode 8 is provided, which ensures that the voltage on capacitor 5 can rise no more than the value of the output voltage of voltage source 7.

A comparator 9 has its inverting input coupled to capacitor 5 and its non-inverting input to a voltage source 10. The voltage source 10 provides a negative voltage offset from the output voltage of voltage source 7 at the non-inverting input of comparator 9. Thus, when the voltage on the capacitor 5 is higher than the voltage on the non-inverting input, the output of comparator 9 is low. On the other hand, when the voltage on the capacitor 5 has fallen below the voltage on the non-inverting input of comparator 9, the output of comparator 9 is high. Thus, the output of comparator 9 will be high when the voltage at input 1 has fallen by more than the offset voltage provided by voltage source 10. The output of comparator 9 is coupled to the D input of a D-type latch 11.

Valley detection circuit 4 operates by comparing a reference current from current source 12 with current drawn through transistor 13, which depends on the rate of change of the voltage at input 1. When the voltage at input 1 first starts to fall, the rate of change of this voltage will be relatively high. The current drawn through transistor 13 will therefore be correspondingly high and at least equal to the current supplied by current source 12. This will cause the non-inverting input of comparator 14 to be at a lower voltage than the voltage at the inverting input, provided by voltage source 15, meaning that the output of comparator 14 will be low. The value of the reference current source 12 will be chosen depending on the rate of change of voltage at input 1 which is taken to be a threshold indicating the presence of a valley. This threshold of the rate of change of voltage at input 1 multiplied by the value of capacitor 2 multiplied by 0.5 (because only half the current flows to valley detection circuit 4, provided transistors 13 and 21 are identical) gives the value required for the current source 12.

As the rate of change of voltage at input 1 drops, the current drawn through transistor 13 will also drop. Eventually, the current supplied by current source 12 will exceed that drawn through transistor 13, causing the current source 12 to saturate at the positive supply voltage. Thus, the voltage at the non-inverting input of comparator 14 will exceed that voltage on the inverting input 15. The output of comparator 14 will go high as a result, indicating that the rate of change of voltage at input 1 is low enough to be considered a valley. It is of course desirable to ensure that the voltage across transistors 13 and 21 does not become too low for these transistors to operate in their linear region.

The output of comparator 14 is coupled to the input of a three-input OR gate 16, the output of which is coupled to the clock input of the D-type latch 11. Thus, when a valley is detected, the value on the D input is clocked through the Q output, which forms the "gate" signal and is used to actuate the external MOSFET (or other) switch in the SMPS. As a result, when a valley is detected, the "gate" signal will be asserted, provided that the comparator 9 has indicated that the voltage at input pin 1 has already fallen sufficiently. In this way, the false triggering mentioned above is prevented.

The "gate stretch" signal is also coupled to an input of input of three-input OR gate 16 to prevent any clocking of the D-type latch 11 whilst the "gate" signal is asserted and for a short time (typically 1 microsecond) afterwards. The "gate" signal is also coupled to an input of three-input OR gate 16 because, when a valley is detected the rate of change of voltage at input 1 (and thus, the external MOSFET switch) is low. When the "gate" signal goes high a new valley can be spuriously detected due to the external MOSFET switch pulling the input 1 down to ground for a prolonged period. The result would be that the clock input of D-type latch 11 would go high and, because the output of comparator 9 would then be low, the Q output of D-type latch 11 would also go low, causing the external MOSFET switch to open at the wrong time. In theory, the "gate" signal is not needed (because the "gate stretch" signal fulfils the function). However, in practice the "gate stretch" signal will go high slightly later than the gate signal due to propagation delay, so it is best to us the "gate" signal as well.

A second comparator has its inverting input coupled to capacitor 5 and its non-inverting input coupled to voltage source 18. This voltage source 18 provides a negative offset voltage (lower than that provide by voltage source 10) from the output voltage of voltage source 7. Thus, the output of comparator 17 will be high if the voltage on capacitor 5 (and hence, the voltage on input 1) falls by more than the offset voltage of voltage source 18.

This output is coupled to a timer 19, which is reset when the "gate stretch" signal goes high. When the timer detects a predetermined period has elapsed since it was reset, its output goes high, provided that the output of comparator 17 is also high at that time. The output of timer 19 is coupled to an input OR gate 20, the output of which is coupled to the set input of D-type latch 11. This forces the Q output to go high, thereby asserting the "gate" signal", if the voltage on capacitor 5 has fallen by more than the offset voltage of voltage source 18 and the time period of timer 19 has elapsed.

The other input of OR gate 20 is coupled to a signal $T_{offmax}$, which goes high when a maximum allowed period during which the "gate" signal is negated has been reached. This ensures that the "gate" period will be asserted even if a valley has not been detected for an excessive period of time, and this prevents the operation of the SMPS from stalling. However, for high frequency application, the start-up period can become very long as a result of this scheme.

Without the circuit of comparator 17 and timer 19, the comparator 9 would have to detect an adequate voltage drop at input 1 before the converter would start operating at the right frequency. Before this voltage drop is achieved the circuit will only switch the "gate" signal on when $T_{offmax}$ is reached. Thus, the frequency of operation is very low, which can result in the current being delivered to the output also being quite low and a slow start-up. However, when the comparator 17 detects a voltage drop (relatively small compared to that detected by comparator 9) then a valley may be expected shortly afterwards. If no valley is detected by valley detection circuit 4, the "gate" signal will be asserted anyway when the time period of timer 19 has elapsed. This results in a faster start-up, because during the start-up period the system is running at a higher frequency.

The circuit of comparator 17 and timer 19 is used to overcome this problem. The time period of timer 19 is chosen to be longer than half a period of the minimum ringing frequency of the SMPS. Thus, where the minimum ringing frequency is 200 kHz, a suitable value for the time period of timer 19 is 2.5 microseconds. This arrangement operates on the assumption that when a certain drop in voltage has been detected at input 1, a valley should follow within a limited period of time.

A signal $T_{onmax}$ is coupled to the reset input of D-type latch 11 to force the "gate" signal to be negated if the "gate" signal has been asserted for longer than an allowed period of time.

The $T_{onmax}$ signal is used to prevent overheating of the SMPS. The peak current through the external MOSFET switch will be used to regulate an output parameter (current through a load or an output voltage, for example). At low input voltages, the time that is needed to reach the required peak current can be long which results in overheating of the external MOSFET switch. For this reason the $T_{onmax}$ signal is used to ensure that the external MOSFET switch will be turned off after the maximum allowed on time, $T_{onmax}$.

A short circuit protection mechanism may also be implemented. When the output is short-circuited, it takes a long time before the current through the coil in the SMPS becomes zero when the external MOSFET switch is turned off. As a result, no valley detection will occur and the comparator 17 will not see enough voltage drop on capacitor 5 to be triggered within the $T_{offmax}$ time. The short circuit protection mechanism therefore causes the reset input of D-type latch 11 to be asserted to inhibit the "gate" signal being asserted if when the $T_{offmax}$ signal is asserted, neither the valley detection nor triggering of comparator 17 has occurred.

The SMPS controller described above finds applications in many areas, for example in powering LED lighting and in mains adapters.

Other variations to the disclosed embodiments can be understood and effected by those skilled in the art in practising the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A switched mode power supply controller comprising:
    a monitoring circuit adapted to monitor a rate of change of a voltage at an input and to monitor a drop in voltage at the input from a peak value,
    wherein the controller is adapted to generate a signal for closing a switch when the monitored rate of change falls below a first predetermined threshold and the monitored drop in voltage exceeds a second predetermined threshold.

2. A SMPS controller according to claim 1, wherein a value of the second predetermined threshold is chosen such that a capacitor coupled to the input and forming part of a charge pump for supplying power, in use, to the SMPS controller is conducting.

3. A SMPS controller according to claim 1, wherein the monitoring circuit is adapted to monitor the drop in voltage by charging a sampling capacitor to a fixed voltage during a first period of operation and discharging the sampling capacitor by drawing a current from it dependent on the rate of change of the voltage at the input during a second period, thereby causing the voltage on the sampling capacitor to drop along with the voltage at the input.

4. A SMPS controller according to claim 3, wherein the first period starts and the second period ends when the signal for closing the switch is asserted.

5. A SMPS controller according to claim 3, wherein the first period ends and the second period starts a guard duration after the signal for closing the switch is negated.

6. A SMPS controller according to claim 3, wherein the monitoring circuit comprises a first comparator adapted to compare the voltage on the sampling capacitor with a first voltage.

7. A SMPS controller according to claim 1, wherein the monitoring circuit is further adapted to generate the signal for closing the switch when the monitored drop in voltage exceeds a third predetermined threshold, lower than or equal to the second predetermined threshold, and a predetermined duration has elapsed after the signal for closing the switch is asserted.

8. A SMPS controller according to claim 7, wherein the monitoring circuit comprises a second comparator adapted to compare the voltage on the sampling capacitor with a second voltage and a timer that is reset when the signal for closing the switch is asserted, the monitoring circuit being adapted to generate the signal for closing the switch when the second comparator indicates that the voltage on the sampling capacitor is lower than the second voltage and the timer indicates that the predetermined duration has elapsed.

9. A SMPS controller according to claim 1, wherein the monitoring circuit is adapted to monitor the rate of change of a voltage at the input by comparing a first current dependent on the rate of change of the voltage at the input with a reference current, the second predetermined threshold being passed when the first current falls below the reference current.

10. A SMPS controller according to claim 1, wherein the monitoring circuit is further adapted to inhibit the generation of the signal for closing the switch if the monitored rate of change does not fall below the first predetermined threshold and the monitored drop in voltage does not exceed the third predetermined threshold within a predetermined time period.

11. A SMPS comprising a controller according to claim 1, the input of the controller being coupled to a node in the SMPS and the output of the controller being coupled for operating a switch.

12. A method of controlling a SMPS, the method comprising:
    monitoring a rate of change of a voltage at an input,
    monitoring a drop in voltage at the input from a peak value, and
    generating a signal for closing the switch when the monitored rate of change falls below a first predetermined threshold and the monitored drop in voltage exceeds a second predetermined threshold.

13. A method according to claim 12, further comprising generating the signal for closing the switch when the monitored drop in voltage exceeds a third predetermined threshold, lower than or equal to the second predetermined threshold, and a predetermined duration has elapsed after the signal for closing the switch is asserted.

14. A method according to claim 13, further comprising inhibiting the generation of the signal for closing the switch if the monitored rate of change does not fall below the first predetermined threshold and the monitored drop in voltage does not exceed the third predetermined threshold within a predetermined time period.

* * * * *